000
United States Patent [19]

Phillips

[11] Patent Number: 4,984,479
[45] Date of Patent: Jan. 15, 1991

[54] CONTROL SYSTEM FOR A SNOW BLOWER TRACTION VEHICLE

[75] Inventor: Wayne Phillips, McDonough, Ga.

[73] Assignee: Fuqua Industries, Inc. (Snapper Division), McDonough, Ga.

[21] Appl. No.: 519,437

[22] Filed: May 4, 1990

[51] Int. Cl.[5] .............................................. G05G 9/08
[52] U.S. Cl. .................................. 74/480 R; 74/501.6
[58] Field of Search .......................... 74/480 R, 501.6; 37/244, 247, 257, 259; 56/10.5, 10.8, 11.4; 180/19.1, 333

[56] References Cited

U.S. PATENT DOCUMENTS

| 2,925,134 | 2/1960 | Cunningham | 180/19.1 X |
| 4,667,459 | 5/1987 | Scanland et al. | 56/10.8 X |
| 4,716,781 | 1/1988 | Dussault | 74/501.6 |
| 4,813,214 | 3/1989 | Barnard et al. | 56/10.5 |

Primary Examiner—Gary L. Smith
Assistant Examiner—Jerry Redman
Attorney, Agent, or Firm—William E. Mouzavires

[57] ABSTRACT

An auxiliary cable control system in a hand lever control system for a walk-behind traction vehicle is directly responsive to movement of a first hand control lever and acts to latch a second hand control lever in its operable position in response to the first hand control means being moved to its operable position, thus freeing one hand of the operator as long as the first hand control lever remains depressed. The auxiliary control cable has a cable support and a pivotal cam-slot lever that cooperates with a stop member associated with the second hand control lever. Once the traction drive hand lever is released, that is, the traction is stopped, both drives are immediately disconnected by means of the auxiliary cable control system.

9 Claims, 2 Drawing Sheets

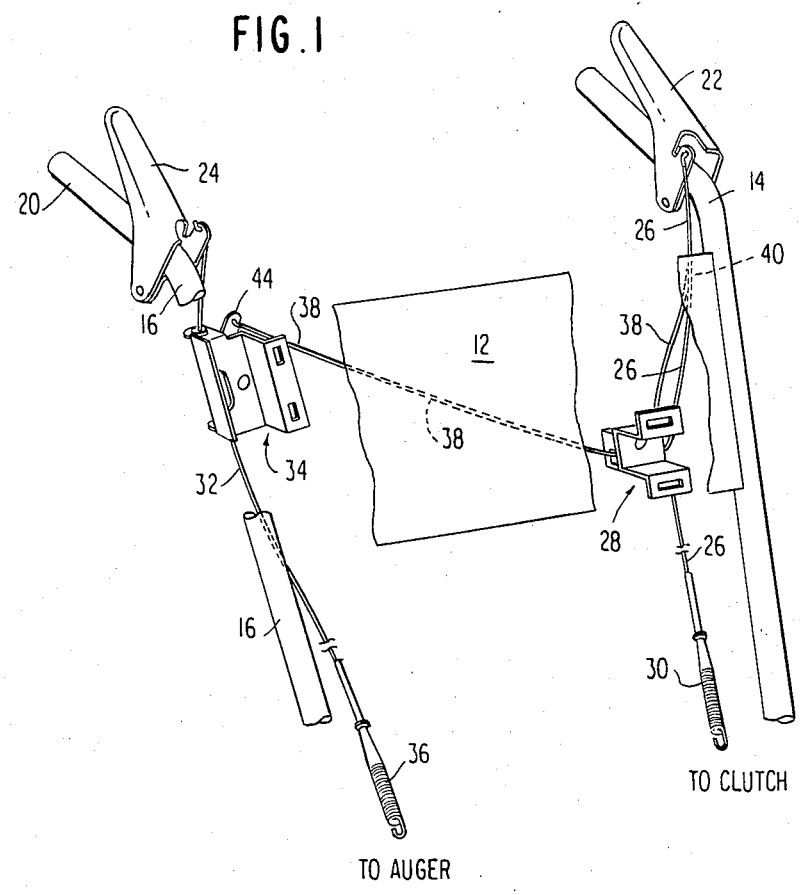
FIG. 1
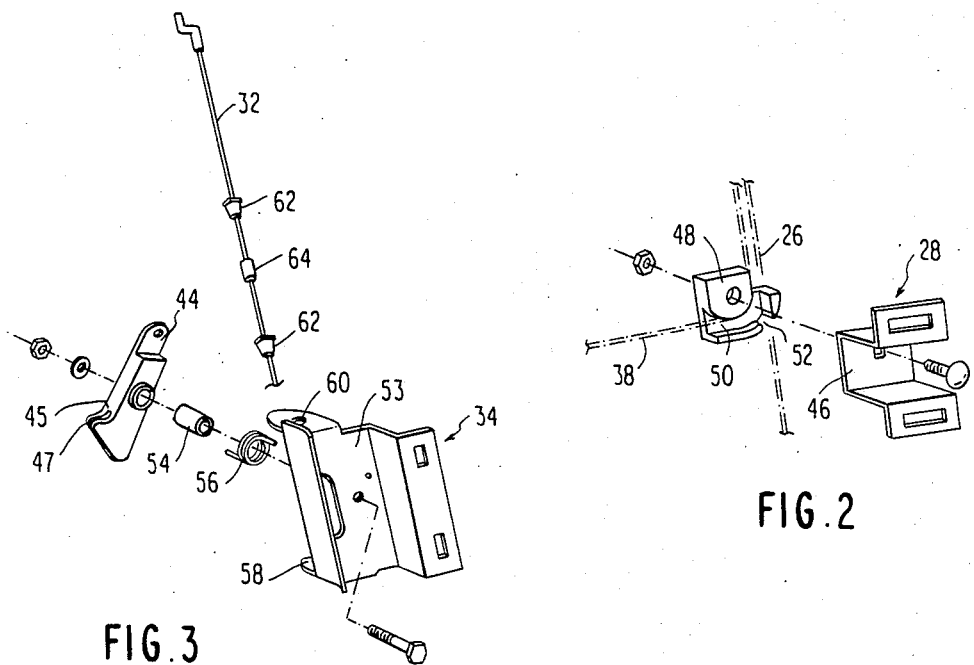
FIG. 2
FIG. 3

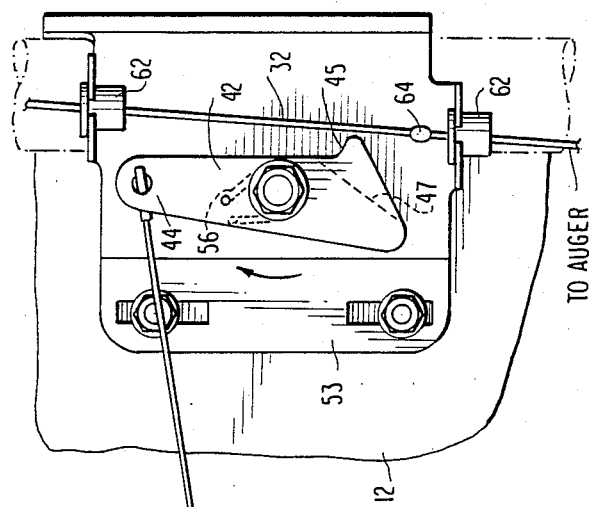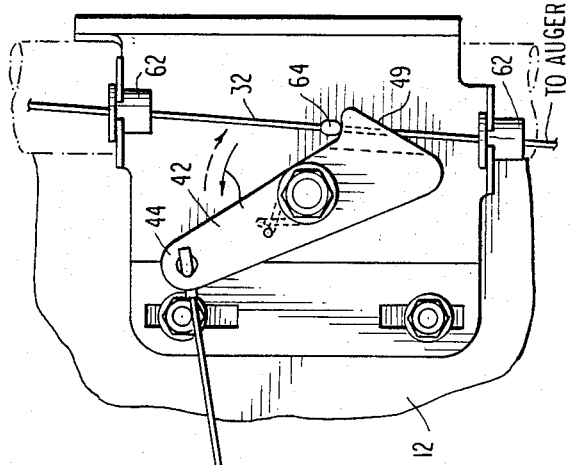
FIG. 4
FIG. 5
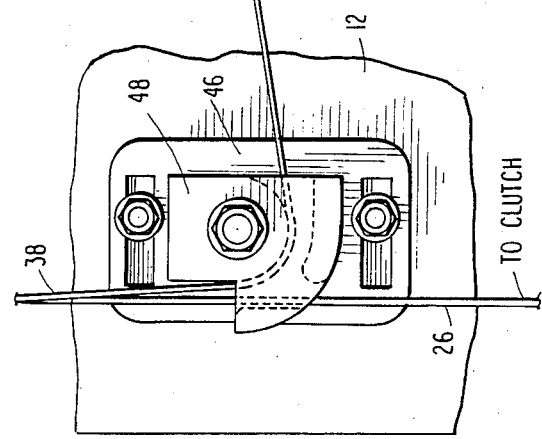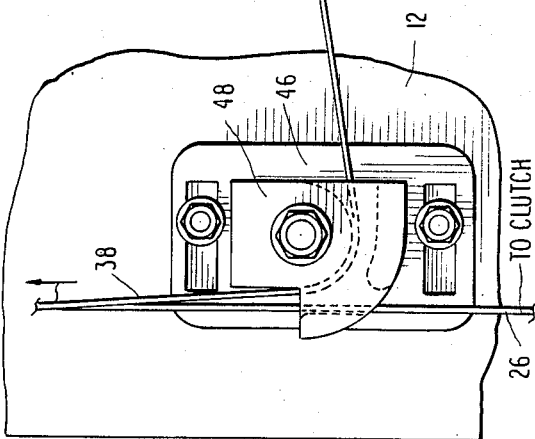

CONTROL SYSTEM FOR A SNOW BLOWER TRACTION VEHICLE

BACKGROUND OF THE INVENTION

This invention relates to hand level control systems for traction vehicles, such as snow blowers, lawn mowers and other walk-behind traction vehicles having a tool or implement operable therewith.

Often it is desirable for the operator of a walk-behind traction vehicle to free one hand while operating a two-handed vehicle, such as a snow blower, lawn mower and the like. In the past this manual freedom has been accomplished by disposing both hand control levers on one handle of the implement, one superimposed on the other, so that operating the one control lever will necessarily operate the other and release of the one will necessarily release the other. In other cases two hand control levers have been positioned adjacent one another on a portion of a U-bar type of handle so that a direct mechanical engagement can be realized between the two levers for effecting a dual control of the implement with one movement of a lever. In such arrangements, however, the appearance of two control levers in a superimposed or side by side relationship on one handle or a portion of one handle is perplexing if not daunting to the average consumer or home-owner operator whose priorities, to be sure, for operating such traction vehicles are simplicity and ease of operation. Besides appearing confusing to the operator, these clustered types of arrangements of control levers, as above described, necessitate a close proximity of parts, including intricate camming mechanisms and pivotal joints such that jamming or deformation of these parts are likely to occur through improper adjustment or use by an irate or inexperienced operator.

OBJECTS AND SUMMARY OF THE INVENTION

The present invention has for its primary object and purpose to provide a hand control lever system for walk-behind traction vehicles, such as snow blowers and lawn mowers and the like, which will afford easy operation of the hand controls without causing confusion to the operator or requiring manual dexterity of a high order. Other ancillary objects of the invention are to provide a hand control system for traction vehicles which has few parts, is durable and offers ready accessibility for adjustment and maintenance of the system.

According to one embodiment of the invention there is provided a first hand control lever on one handle member (the left side handle) of the traction vehicle, which is connected to the traction drive connection and is movable by the operator's left hand between an operable and inoperable position, and a second hand control lever on the other handle bar (the right side handle) which is connected to the tool drive connection and is movable by the operator's right hand between an operable and inoperable position. Also provided is an auxiliary control cable having a cable support and a pivotal cam-slot lever associated with a stop member on the second hand control connection. The control cable is directly responsive to movement of the first hand control lever and acts to latch the second hand contol lever in its operable position in response to the first hand control means being moved to its operable position. In this way the right hand of the operator can be freed for whatever reason as long as his or her left hand grips the left hand control lever and holds it in its operable position; thus, it will be seen that once the traction of the vehicle is implemented (by closing one's grasp on the first hand lever and thereby engaging the drive clutch), the right hand lever may be closed to its operable position (thereby engaging the tool implement, sush as the auger for a snow blower) and that hand may then be subsequently removed for whatever reason so long as the left hand is gripping the first or left hand lever. However, once the left hand lever is released, that is, the traction is stopped, both drives are immediately disconnected by means of the auxiliary control system.

The invention will be better understood as well as further objects and advantages thereof become more apparent from the ensuing detailed description taken in conjunction with the drawings.

BRIEF DESCRIPTION OF THE DRAWINGS

FIG. 1 is a schematic perspective view, partially broken away, of the hand control system according to the invention seen from the front of the implement;

FIG. 2 is a schematic perspective view of the auxiliary control cable support used with the invention;

FIG. 3 is a schematic perspective view showing of the pivoted cam-slot lever used with the invention;

FIG. 4 is a schematic plan view, partly broken away, seen from the rear of the implement showing the auxiliary control system in its inoperable position; and FIG. 5 is a schematic plan view, partly broken away, seen from the rear of the implement, showing the auxiliary control system in its operable position.

DETAILED DESCRIPTION

Referring now to FIG. 1, there is shown generally at 10 a powered traction vehicle, such as a snow blower or like vehicle, such as a lawn mower, a seed spreader, or any power traction vehicle that is designed for walking behind and requires two modes of control, one for the traction drive of the vehicle and the other for implementing the tool drive associated with the vehicle. A frame member 12 is shown connecting a left handle member 14 and a right handle member 16. Each of the handle members terminates in a hand gripping portion, 18 and 20 respectively. A hand control lever 22 is shown pivoted to the left handle grip 18 for movement between a closed operable position and an opened inoperable position, as well know in the art. A spring, not shown, is usually provided for biasing the handle 22 in its opened inoperable position. In like manner a hand control lever 24 is pivoted to the right handle bar member 20.

Connected to the first mentioned hand control lever 22 is a cable 26 rotatably secured in a known manner to a forward portion of the lever 22, as shown. The cable 26 is guided by a guide support member 28 (to be more fully discussed below) to directly connect in a known manner with a connector 30 for the clutch of the wheel drive of the snow blower, as shown. In like manner a cable 32 is rotatably supported at the forward end of the hand lever 24 and is guided through a cam-slot lever support member 34 (to be more fully discussed below) to directly connect with a connector 36 for the auger drive of the snow blower, as shown in FIG. 1. It will be understood that squeezing either hand lever 22 or 24 with respect to its handle bar 18, 20, respectively, will cause the associated cable 26 or 32 to move either the clutch drive or the auger drive into engagement, as is well known in the art.

In accordance with the invention, one end of a auxiliary control cable system 38 is fixedly secured by any suitable means at 40 to the clutch control cable 26; as a consequence, cable 38 is directly responsive to movement of the cable 26. After being guided by guide support member 28, the other end of cable 38 is pivotally connected to a cam-slot lever 42 at one end 44 thereof. The cam slot lever is rotatably supported by the support member 34 and is provided with a latching recess 45 near its other end as well as a slot 47 inclined with respect to the long axis of the lever and a camming surface 49, to be more fully explained below.

As shown in FIG. 2, the support member 28 is made up of a bracket 46 which is attached by conventional means to the frame 12. The bracket 46 secures by suitable means a guide member 48 which has two orthogonally related guide slots 50, 52. Guide slot 50 guides the auxiliary cable member 38 towards the right handle member and guide slot 52 guides cable 26 towards the clutch connector 30.

As shown in FIG. 3, the cam-slot lever support member 34 comprises a bracket 53 which is secured by suitable means to the frame 12 and in turn rotatably supports about a bushing 54 the cam slot lever 42. A torsion spring 56 surrounds the bushing 54 and has one end secured to the bracket 53 and its other end secured to the cam slot lever 42 in a well known manner for causing the cam slot lever to normally rotate away from the cable 32, to be more fully explained below. The bracket 53 is further provided with a pair of ears 58 having aligned apertures 60 for supporting bushings 62 which serve to guide the cable 32 adjacent the slot 47 in the cam-slot lever 42, as well as to position between the bushings 62 an arresting member 64 in the form of a ball-shaped fitting fixedly secured to the cable 32, to be explained more fully below.

Referring now to FIG. 4 and 5, the exact configuration of the cable 38 with respect to the guide support member 28 and the cam-slot lever support member 34 will be explained. Each of the FIGS. 4 and 5 views the invention from the rear of the traction vehicle 10. In FIG. 4 the auxiliary cable 38 is shown in its inoperable position, wherein the cam-slot lever 42 is normally biased by spring 56 out of engagement with the auger control cable 26. The auxiliary cable 38 is seen to be guided from a generally horizontal direction by the guide connecting guide slots 50, 52 in guide member 48 into a generally vertical direction. The vertical guide slot 52 also allows the cable 26 to travel in a generally vertical direction directly to the clutch connector 30. It will be seen in FIG. 4 that the cam-slot lever 42 is out of engagement with the cable 32 because of the action of torsion spring 56 biasing the lever counter clockwise as seen in the drawing. If, however, the cable 38 is caused to pull the cam-slot lever 42 to the left (counter clockwise) as a result of the cable 26 being pulled by its associated hand lever to engage the clutch drive of the traction vehicle (since the two cable 26 and 38 are directly connected with each other), the slot 47 will then ride into and engage the cable 32. When this happens, it will be seen from the drawing that the arresting or stop member 64 affixed to the cable 32 will be disposed below the lever 42. When, however, the cable 32 is pulled by its associated hand lever to thereby engage the auger drive, the stop member 64 will ride up (its movement facilitated by the roundness of the fitting) along the sloped camming surface 49 of the lever 42 and then slip into the curved latching recess 45 where it will be held from return movement should the hand lever associated with the auger drive and its associated cable 32 be released (see FIG. 5). Should, however, the hand lever associated with the traction drive of the vehicle be released (thus bringing to a stop the traction of the vehicle, usually with the aid of a dead-man stop feature, well know in the art), then the cable 38 will be released, allowing the cam-slot lever 42 to rotate clockwise (as seen in the drawing) to thereby free the stop member 64 from the latching recess 47 and allow the cable 32 to be released, thus disengaging the auger drive.

The operation of the hand lever control system according to the invention is as follows. As described above the two hand levers 22, 24 are mounted on opposite handle bars 18, 20, respectively, of the snow blower. Depression of the traction drive lever 22 will engage the traction drive of the snow blower, while at the same time rotating the cam-slot lever 42 via the cable 38 so that the slot 47 will engage the cable 32 associated with the hand control lever 20 for the auger drive. If now the the hand control lever 20 is depressed, the stop member 64 on the cable 32 will cam along the surface 49 of the cam-slot lever 42 and eventually slip into the latching recess 45 to maintain the auger drive as long as the traction drive is hand lever 22 is depressed. This arrangement, of course, allows the operator to free his right hand from the auger drive hand control lever 24 for whatever purpose without interrupting drive to the auger. Should the operator release the traction drive lever 22, however, the cam-slot lever 42 will rotate away from the cable 32 under the action for the torsion spring 56 to thereby release the member 64 and cause the auger drive to be disengaged. It should be understood that the two hand control levers 22, 24 may be depressed in any sequence and still obtain the same results as above described. It should be also understood that the hand control levers may be reversed with respect to each other from that shown in the drawings, so that the traction drive is on the left and the auger drive is on the right. Since most people are right handed and would prefer that hand to be free during operation of the vehicle, the arrangement as above discussed with respect to the drawings is preferred.

The foregoing relates to preferred exemplary embodiment of the present invention, it being understood that other embodiments and variants thereof are possible within the scope of the invention, the latter being defined by the appended claims.

What is claimed and desired to be secured by Letters Patent of the United States is:

1. In a power driven traction vehicle having a tool operated therewith, a hand control system comprising,
   a wheel drive connecting means,
   a tool drive connecting means,
   a first hand control means connected to said wheel drive connecting means and movable between an operable and inoperable position,
   a second hand control means connected to said tool drive connecting means and movable between an operable and inoperable position
   an auxiliary control means responsive to said first hand control means, and
   said auxiliary control means having a retaining means for retaining said second hand control means in its operable position in response to said first hand control means being moved to its operable position and releasing said second hand control means in response to said first hand control means being moved to its inoperable position.

2. In a power driven traction vehicle according to claim 1, wherein said first hand control means is disposed on a first handle means, and said second hand control means is disposed on a second handle means, said first and second handle means being separate, one from the other.

3. In a power driven traction vehicle according to claim 1, wherein said second hand control means includes a cable means, and said auxiliary control means includes a cable means.

4. In a power driven traction vehicle according to claim 3, wherein said cable means for said auxiliary control means is connected to said first hand control means.

5. In a power driven traction vehicle, according to claim 4, wherein said retaining means further comprises a cam-slot lever for engaging a portion of said cable means of said second hand control means, said cam-slot lever having rotary support means and being connected at one end thereof to said cable means for said auxiliary control means.

6. In a power driven traction vehicle according to claim 5, wherein said rotary support means for said cam-slot lever comprises means for normally biasing said cam-slot lever out of engagement from said cable of said second hand control means.

7. In a power driven traction vehicle, according to claim 6, wherein said cam-slot lever further comprises a camming surface, and said cable means of second hand control means comprises a stop means affixed thereto, said stop means being adapted to ride along said camming surface of said cam-slot lever when said cam-slot lever engages said cable means of said second hand control means prior to engaging said retaining means when said second hand control means is moved from its inoperable position to its operable position.

8. In a power driven snow blower having an auger operated therewith, a hand control system comprising,
a wheel drive connecting means,
an auger drive connecting means,
a first hand control means connected to said drive connecting means and movable between an operable and inoperable position, said first hand control means being disposed on a first handle means,
a second hand control means connected to said auger drive connecting means and movable between an operable and inoperable position, said second hand control means being disposed on a second handle means,
said second hand control means having a stop means,
an auxiliary control means responsive to said first hand control means,
said auxiliary control means having a lever for engaging said second hand control means and allowing free movement of said stop means of said second hand control means during movement of said second hand control means from its inoperable position to its operable position, and
said lever having a means for engaging said stop means for arresting movement of said second hand control means from its operable position to its inoperable position.

9. In a power driven vehicle having a mechanism operated therewith, a hand control system comprising,
a first connecting means for driving the vehicle,
a second connecting means for driving the mechanism,
a first hand control means connected to said drive connecting means and movable between an operable and inoperable position,
a second hand control means connected to said first connecting means and movable between an operable and inoperable position, and
an auxiliary control means responsive to said first hand control means and having a lever for allowing free movement of said second hand control means from its inoperable position to its operable position, and for arresting movement of said second hand control means from its operable position to its inoperable position when said first hand control means is in its operable position.

* * * * *